Jan. 27, 1931.  W. D. WHITCOMB  1,790,127
GRAPHIC CHART
Filed Sept. 19, 1928  6 Sheets-Sheet 3
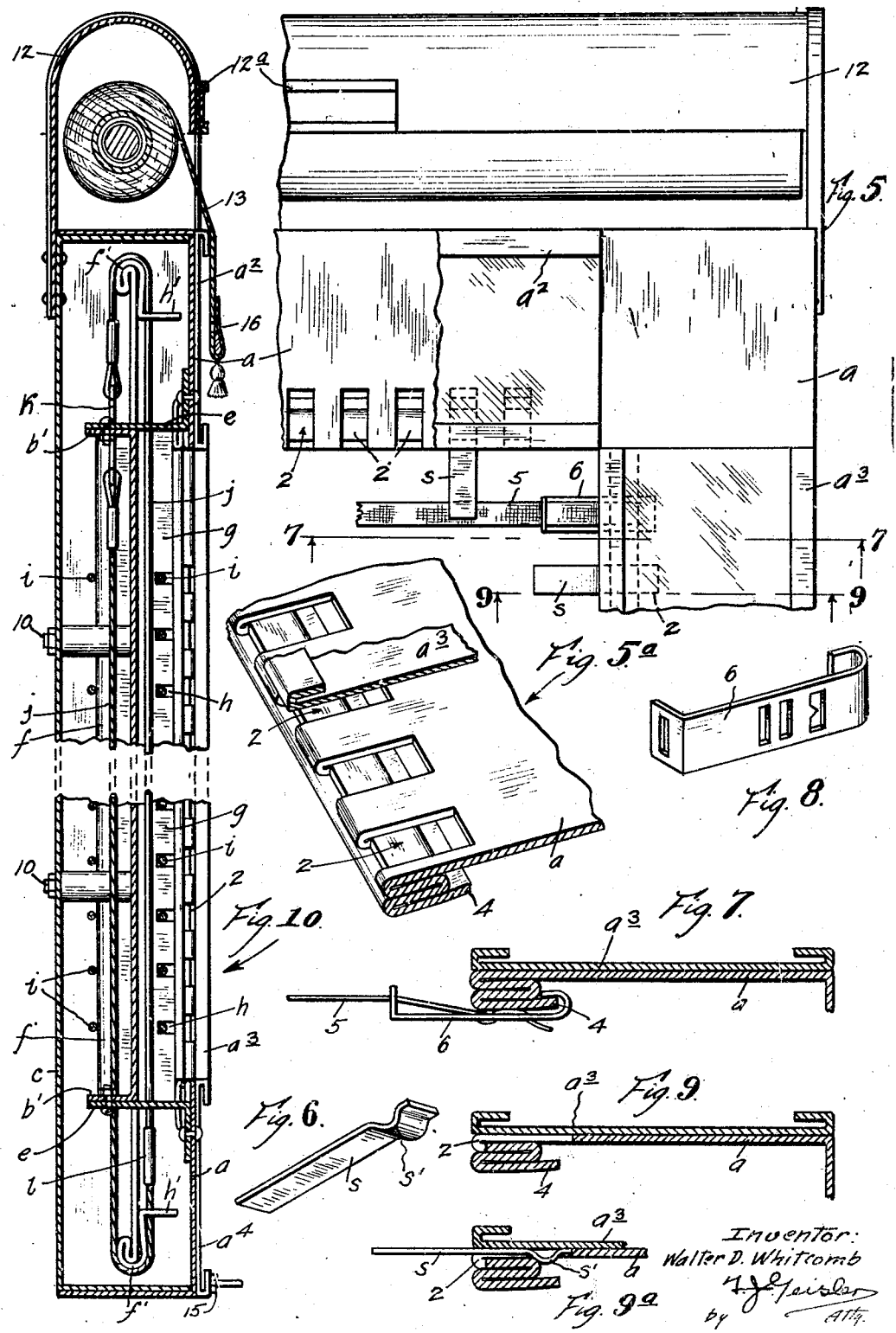

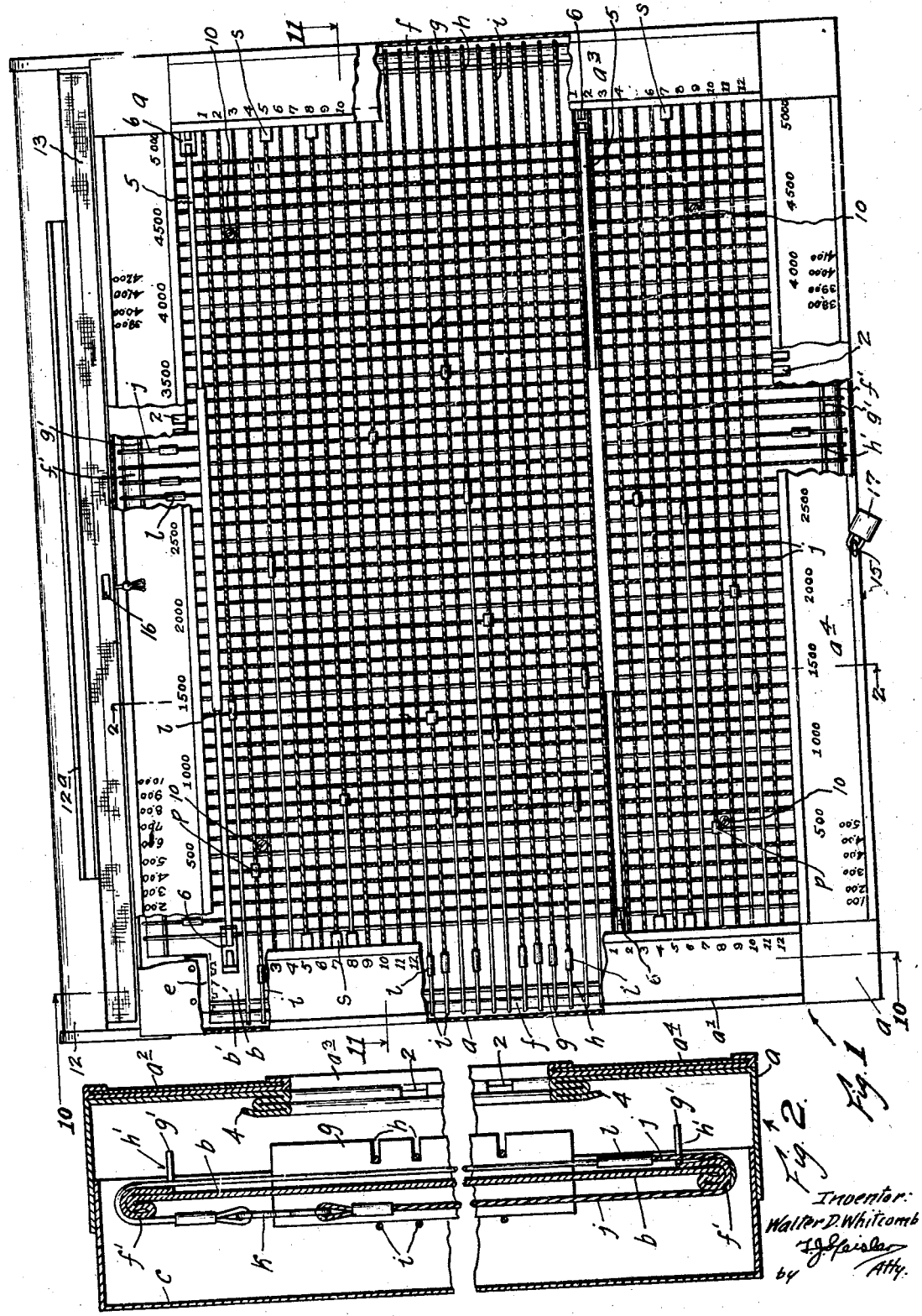

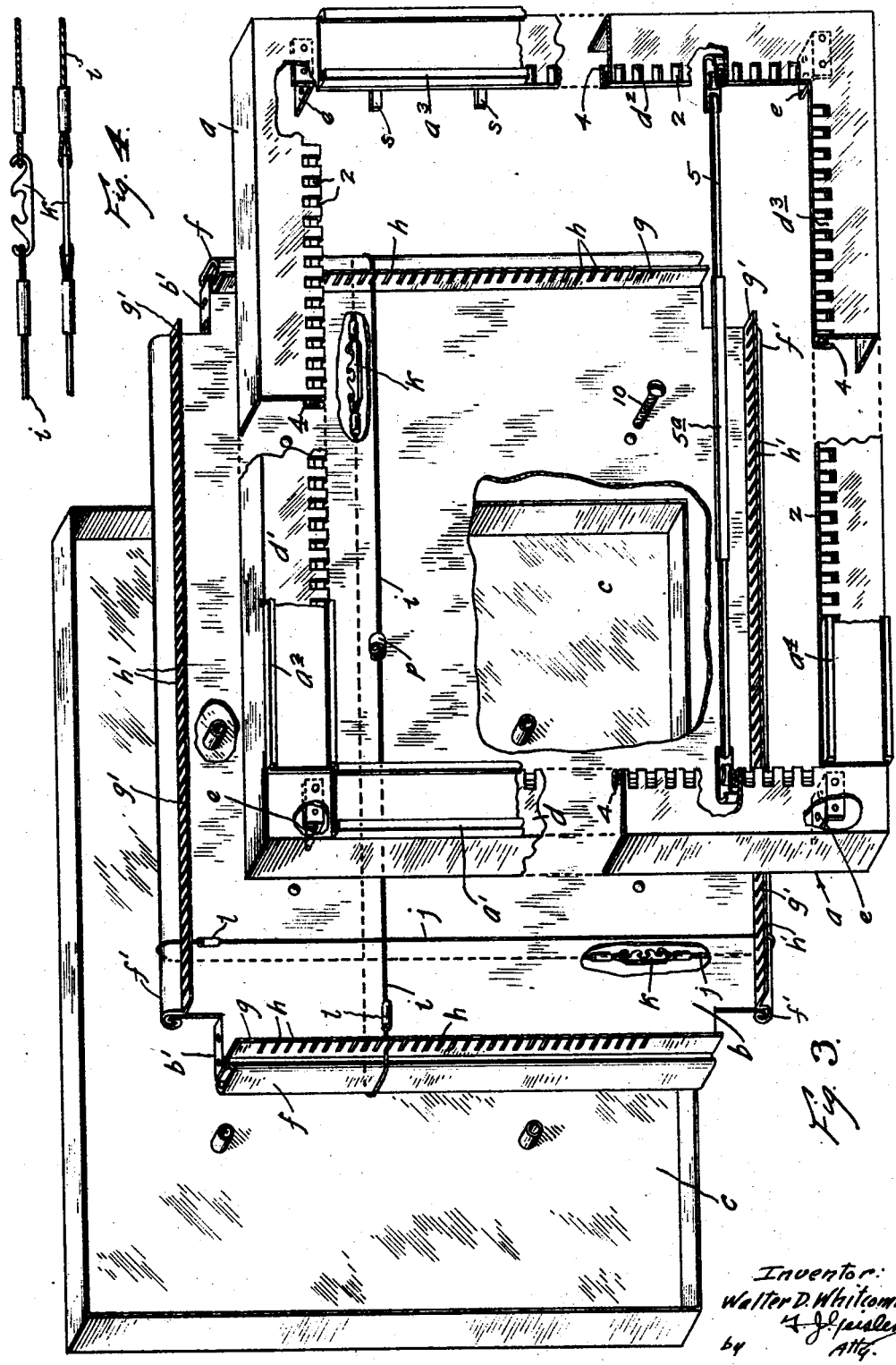

Jan. 27, 1931. W. D. WHITCOMB 1,790,127
GRAPHIC CHART
Filed Sept. 19, 1928 6 Sheets-Sheet 4
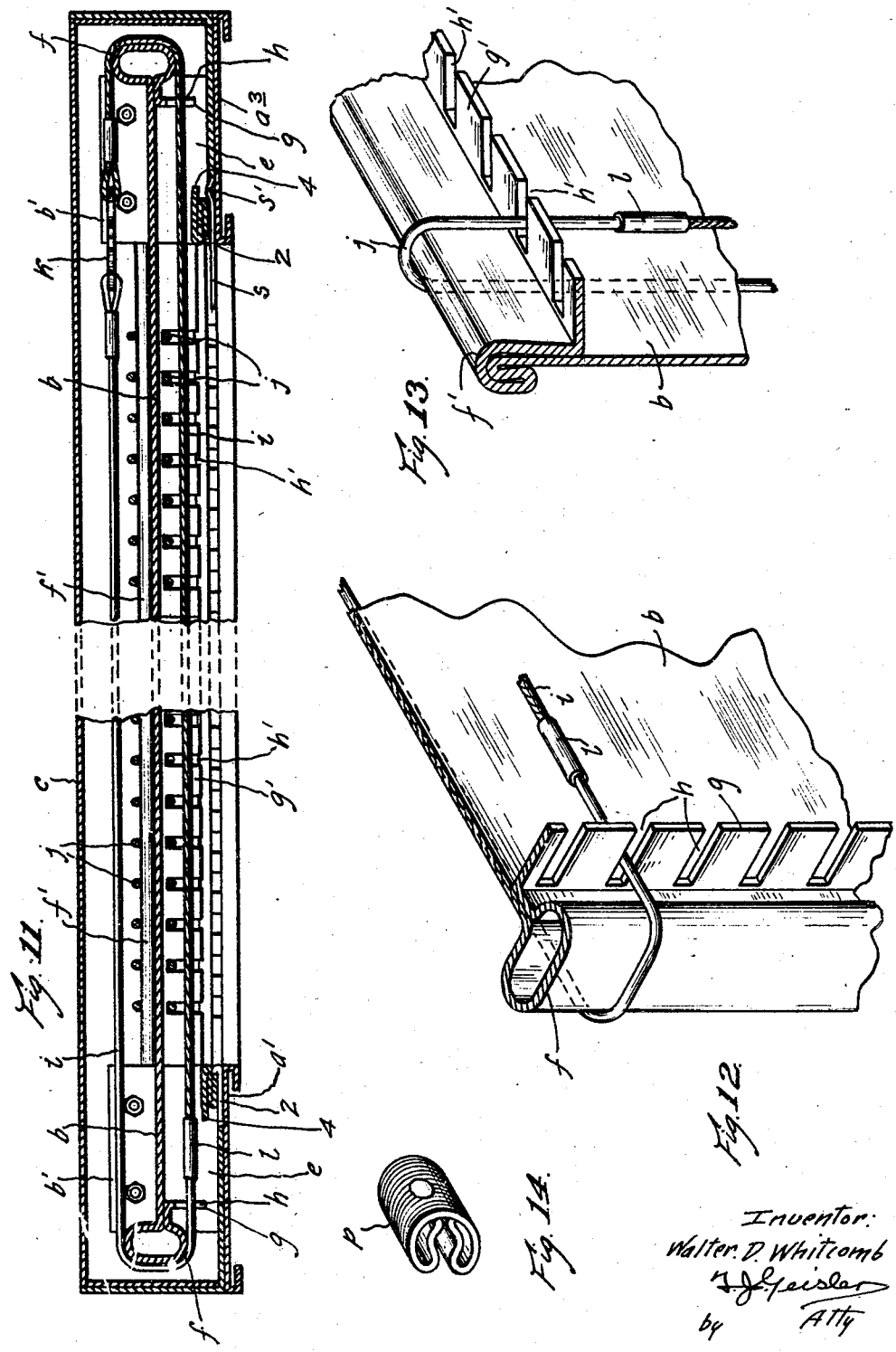

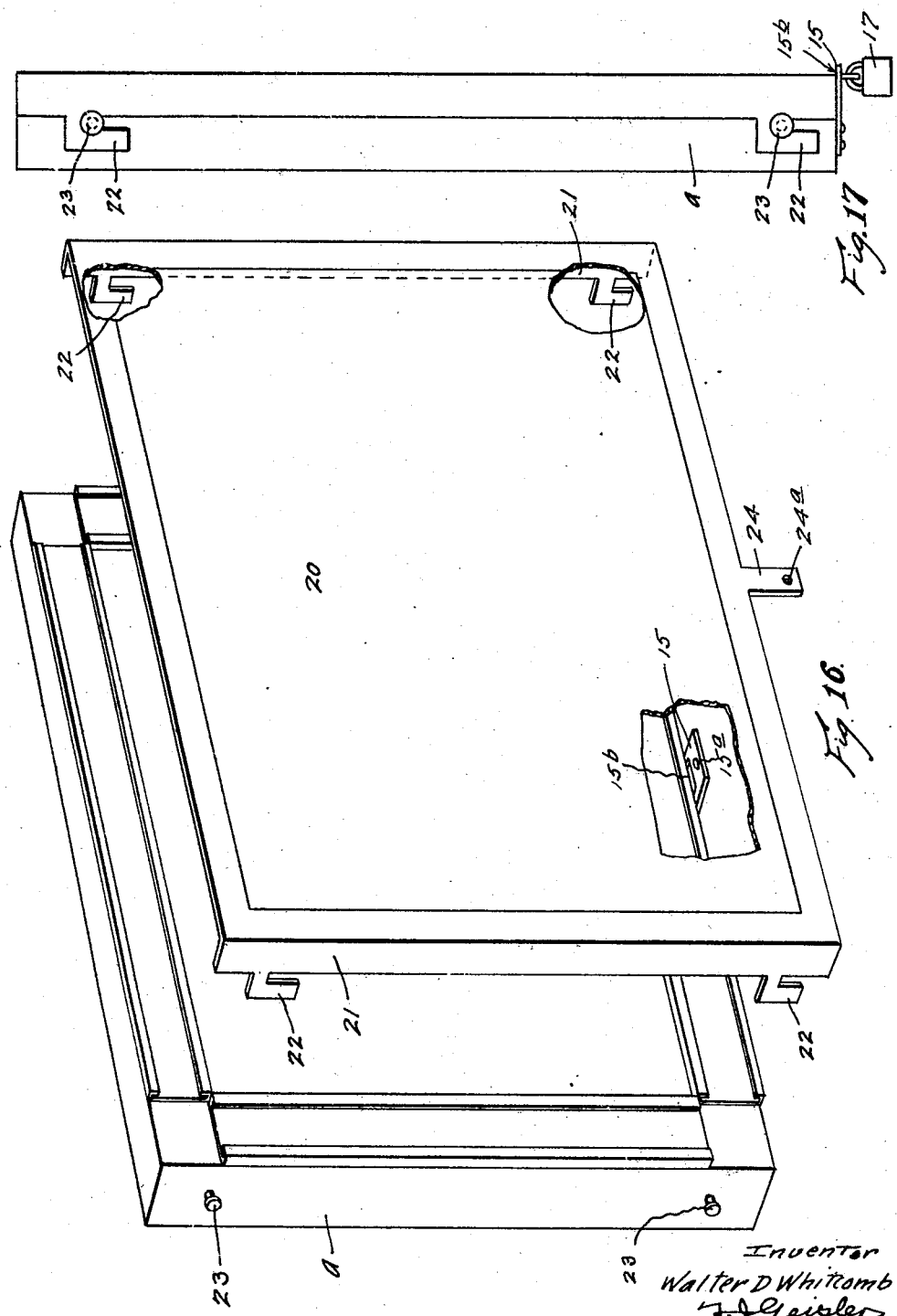

Patented Jan. 27, 1931

1,790,127

UNITED STATES PATENT OFFICE

WALTER D. WHITCOMB, OF PORTLAND, OREGON

GRAPHIC CHART

Application filed September 19, 1928. Serial No. 306,966.

My invention relates to charts provided with movable indicia elements arrangeable to indicate a graph of some particular existing set of facts, especially as relating to a business enterprise.

The object of my invention is to provide a chart having movable devices arranged to indicate certain correlated items of information in order thereby to render the information so given, comprehensible, with reference to their bearing on each other.

So that for example, in a mercantile enterprise comprising a chain of stores; the sales, profits and expenses of each store may be shown individually, and simultaneously for several periods, as for this month and the same month a year ago.

A further object of my invention is to provide a chart adapted to be readily and conveniently adjusted to display the given items in such a manner that certain facts may be conveniently and accurately deduced from a comparison of the profits, expenses and the volume of sales of a group of stores.

A further object of my invention is to provide a chart of relatively simple construction having but few moving parts, and these so arranged as not to be liable to get out of order, or likely to become unduly worn in service.

A still further object of my invention is to provide a graphic chart so constructed and having the data represented by its indicia elements so arranged as to be adapted for convenient and successful photographing, in order in that way to obtain and preserve a permanent record.

I attain my objects in a graphical chart comprising a case consisting of a back and sides, one or more of the sides provided with means adapted to carry a strip bearing marginal notations, and a primary, and a complementary series of independent, lineal indicia elements, one of said series overlying and intersecting the other, and each of said indicia elements being arranged relative to a particular item of said marginal notations and independently lineally movable. The said lineal elements having sections contrasted with each other and carrying markers at the dividing lines of said contrasted sections. Other markers removably affixed to said indicia elements for reference to certain items of said marginal notations arranged parallel with the indicia element to which the markers last referred to are affixed, and the sides of said frame being adapted to have other auxiliary markers removably affixed thereto for reference to certain items of the marginal notations carried by such frame side. I also provide movable bar-like lineal elements affixed to the frame, crosswise dividing the face of the separate section and a lockable cover for the case.

For certain charting work I prefer to make said indicia elements with contrasting sections, and furthermore to use movable markers which may be affixed to the said lineal indicia elements, and thus used in connection with said notations, so as to enable the use of my chart to indicate relatively, and comparatively particular statistical facts, or other items of information.

I further preferably provide movable divider bars carried by said base, for the purpose of dividing and segregating the items of information there given into two or more groups as may be desirable in certain instances, as hereinafter more fully explained.

The details of construction of my chart and the application to a given set of facts and mode of adjustment, are hereinafter fully described, in referring to the accompanying drawings, in which:

Fig. 1 shows a front elevation of my invention, portions being broken away to disclose the details of construction;

Fig. 2 shows an enlarged fragmentary section taken on the line 2—2 of Fig. 1, looking in the direction of the arrows, the frame and back cover being partly separated;

Fig. 3 shows a perspective view of my chart the several parts being separated to better illustrate their construction;

Fig. 4 shows the means employed for connecting the ends of the movable indicia;

Figs. 5 and 5a show diagrammatically two enlarged fragmentary views of my chart, illustrating the means of carrying the marginal markers;

Fig. 6 shows a perspective view of the marginal marker;

Fig. 7 shows a sectional view taken on the line 7—7 of Fig. 5 and illustrates the fastening means for the ends of the divider bars;

Fig. 8 shows in detail, the fastening means for the ends of the divider bars;

Figs. 9 and 9a show in a section taken on the line 9—9 of Fig. 5, the details of the means for securing the marginal markers in place;

Fig. 10 shows a section taken on the line 10—10 of Fig. 1;

Fig. 11 shows a section taken on the line 11—11 of Fig 1;

Fig. 12 shows a fragmentary perspective view of one of the rounded edges of the divider section;

Fig. 13 shows similarly a fragmentary perspective view of the other edge;

Fig. 14 shows a perspective view of the removable marker carried by the indicia;

Figs. 16 and 17 show two views of a modified form of cover for my chart.

Figure 15:
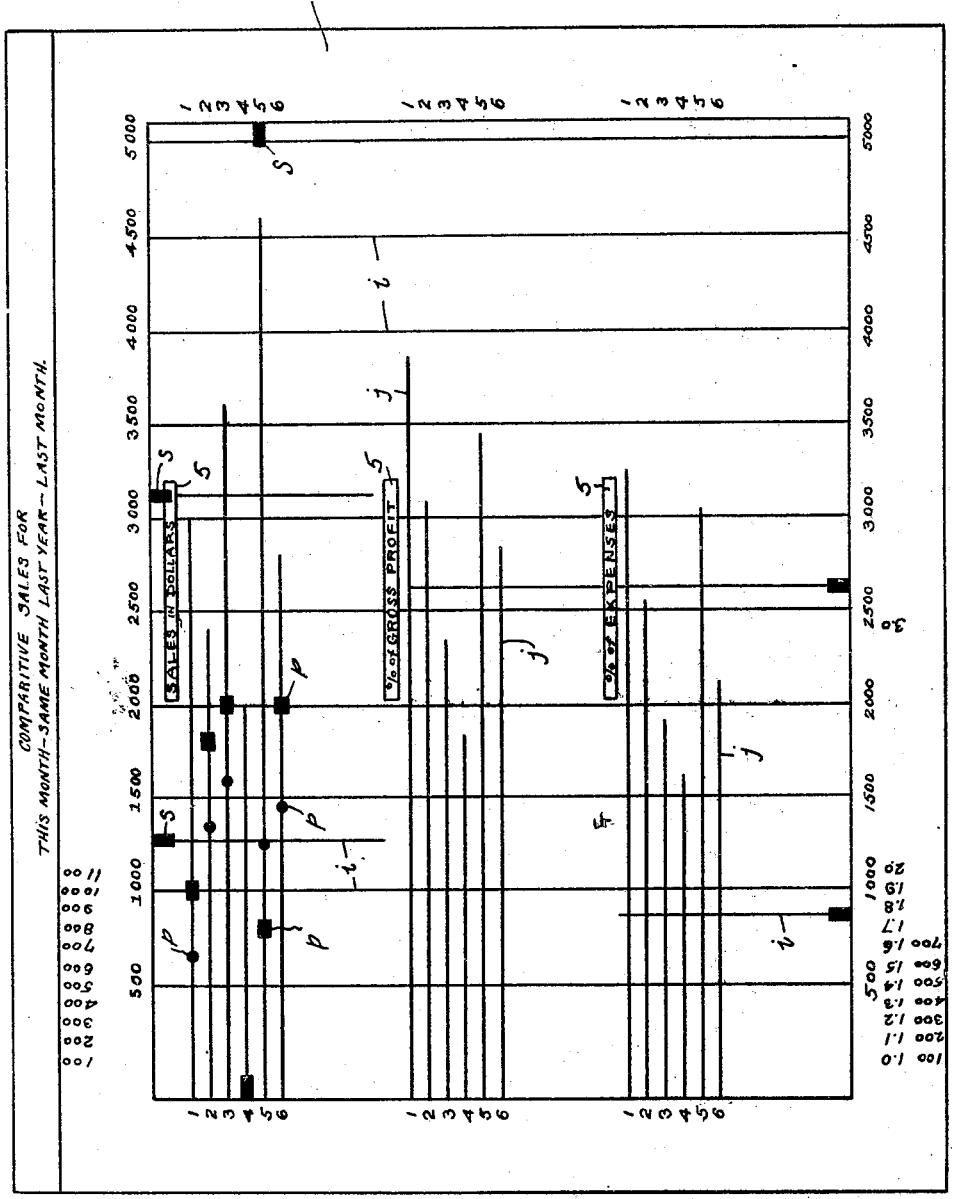
Fig. 15 illustrates diagrammatically one application of my chart to a given set of facts.

My invention comprises, referring to the drawings, a more or less rectangular frame $a$, a divider section $b$ and a back cover $c$ over which the divider section and the frame are assembled.

The frame $a$ is formed with marginal faces $d$, $d'$, $d2$, $d3$, carrying metal strips or card holders $a'$, $a2$, $a3$, $a4$, formed with parallel inturned flanges, adapted to receive elongate strips of paper, preferably of the width of standard adding machine rolls.

The divider section $b$ is of slightly lesser dimensions than the frame $a$ and is adapted to be secured in the frame to brackets $e$, provided adjacent the interior corners of the frame, by means of lateral ears $b'$ at its corner. The divider section $b$, is formed with rounded edges $f$ and $f'$ and with perpendicular flanges $g$, $g'$, adjacent the edges, provided with spaced notches $h$, $h'$, respectively.

Indicia elements comprising endless cords or belts $i$ are arranged about the divider section $b$ and in the corresponding opposite notches $h$, the notches serving to maintain the cords in parallel spaced relation, cords $j$ are also arranged over the divider section, perpendicularly to the cords $i$, and in the correspondingly opposite notches $h'$. The rounded edges $f$, $f'$ of the divider section permit the cords to be moved longitudinally about the divider section without friction and wear and the rounded edges $f$ are somewhat wider than the edges $f'$, so that the cords are spaced from each other to prevent interfering one with the other, as they are moved.

The cords $i$ and $j$ are identical and comprise two equal sections of different color, white and black in this embodiment of my invention, fastened together at their ends by notched coupling plates $k$, Fig. 4, which permit the ends of the cords to be looped over the notches to adjust their tension. Cylindrical clasps $l$ are provided on the cords at the junction of the colored portions and serve as markers to emphasize the contrast between them.

Cylindrical spring clips or markers $p$ of a variety of colors such as red, white or blue, are provided adapted to be removably fastened on the cords to serve as supplementary markers.

Other markers $s$, formed with a transverse bead $s'$ adjacent one end are provided adapted to be inserted in recesses 2 in the interior rim of the frame and held in place by said bead. The recesses 2 are formed by cutout sections in infolded portions of the metal at the edge of the frame and by the card holders $a'$, $a2$, $a3$, and $a4$, on the marginal surfaces of the frame. An inturned flange 4, is also provided on the inner side of said frame adjacent the edge, to which horizontal divider bars 5, comprising sections of elastic tape provided with hooks 6 on each end are secured, respectively, to the opposite flanges 4.

The divider bars 5 are provided with slidable, centrally arranged card holders $5a$ of a suitable transparent material, for holding a card bearing any desired notation, as gross profits, expenses, etc.

The back cover $c$ is of such dimensions as to contain the divider section $b$ and is secured therein by bolts 10, which permit the display of the open face of the chart.

Since my chart is adapted to displaying graphical presentations for photographing, and since white and black are the only colors possible to show by photography, I provide white stars, arrows or cubes on the surface of the red or blue markers, to distinguish them when photographed.

The divider section $b$, is also, preferably black and the exterior metal surface of my chart is also a dark color and the cords $i$ and $j$ being composed of white and black sections, the chart is thus effectively adapted for being photographed, in which case, the white portions will show as black and the black background as white as illustrated in Fig. 15.

My chart is preferably made of light sheet metal, stamped and folded to the desired form and is light of weight and adapted to be conveniently carried from place to place, to be set on a table, or hung on the wall as during an employes' lecture or a directors' meeting.

A housing 12 is provided on the top of the back cover $c$, and a curtain 13 is provided therein, adapted to be pulled down to cover the face of the chart. A lug 15 provided with an eye $15a$ is provided at the bottom of the chart, adapted to be inserted through a hole 16 in the curtain, so that the curtain may be locked in place, by fastening a padlock 17 in the said eye, or by other suitable means.

On the front face of the housing 12 is provided a card holder 12a bearing the legend of the chart, that is, explanatory notes of the symbols used.

Referring to Figs. 16 and 17 I have shown a modified form of cover for my chart, adapted to be used in the place of the curtain 13 or in combination with it. In the latter case, the cover may be of transparent material, so that while open to inspection, the face of the chart may be protected from casual or malicious tampering or alterations, the curtain at the same time being used to protect the chart from merely curious inspection.

This cover comprises a plane section 20, proportioned to cover the chart and provided with opposite lateral sides 21 provided with hooks 22, adapted to be engaged with projecting knobs 23, on the sides of the chart and also formed with a downwardly projecting lug 24, capable of being inserted through a slot 15b, formed in the lug 15 on the bottom of the chart at the same time the hooks 22 are engaged with the knobs 23, on the sides of the chart. The padlock 17, may then be secured in an eye 24a in the end of the lug 24 and the cover securely fixed over the chart.

The card holders $a'$, $a2$, $a3$ and $a4$, are adapted for receiving adding machine tape which is of standard width and the spacing between the horizontal and the vertical cords conforms with the triple spacing of all standard adding machines and typewriters, so that desired scales or memoranda bearing given data may be quickly and easily prepared. As for instance, columns of figures or lists of names or the like.

In application of my chart for displaying the various relationships of a specific set of facts, take for example, a mercantile enterprise of say a chain of six stores, in which it is desired to display as illustrated in Fig. 15, the sales of each store for this month and the same month a year ago: for comparison the average monthly sales of all the stores for both periods and those stores showing profit or loss and volume increase.

The holder plate $a'$ will be provided with a strip of adding machine tape, bearing the names or numbers of the six stores.

The holder plate $a2$ will be provided with a list of figures in dollars, say from $500 to $5000, depending on the range of sales of the stores. The white portion of the cord $i$ opposite store #1, the monthly sales of which have been $3,000, will be advanced until the clip 1, marking the point between the white and black portion is brought to the vertical cord $j$ opposite the $3,000 mark on the plate holder $3a$. Similarly the cords $i$ opposite the other stores will be advanced to correspond to their sales of $2400, $3600, $2000, $4600 and $2800, respectively.

Similarly the card holder $a4$ may be provided with percentage columns showing the same values in percentage as shown in dollars in the card holder $a2$.

Now to show the monthly sales, of a year ago, white spring clips $p$ will be secured to the cords $i$ at their intersections with the cords $j$ corresponding to the respective sales of a year ago, as for instance at the $1000, $1800, $2000, $500, $800 and $2000, marks respectively. If it is desired to show the sales also for a third period, a red clip $p$ may be used, provided with a white circle or the like, so that it will show and be distinguishable when photographed. For emphasis the white portion of the vertical cords $j$ opposite these figures may be advanced, so that at a glance, the averages may be seen.

Now, say the average monthly sales of all the stores for this month and a year ago were $3066 and $1300, respectively. A white marker $s$ will be inserted in the recess 2 in the edge of the marginal face $d'$ opposite the corresponding sums.

Also to indicate a store which has earned a profit, a marker $s$ may be inserted at the right of the chart on the line of the store, and if a store has lost throughout the year, another marker $s$ may be inserted at the left, as illustrated in Fig. 15.

For convenience every fifth vertical cord $j$ may be pulled down to display all white, thereby providing vertical guides for the eye. The markers $s$ may be used on the margins $d$, $d2$, $d3$, to indicate loss, profit, gain, and so forth as required, the markers bearing symbols explained in the notations in the card holder 12a.

It is obvious that similarly costs, profits, expenses, and so forth may be shown, by itself or simultaneously with the above example, by dividing my chart with the divider bars 5, and showing similarly gross profits and expenses either by percent or in units.

Thus my chart is adapted to display, graphically and comparatively, all classes of statistical information, as it may well be used for data concerning money, weights or lineal measurements, growth or population and so on, by merely making the necessary changes in the marginal notations, by the substitution of one set of scales for another.

Now we will have displayed these facts for comparison and graphical presentation. To show the curve of a given set of facts a white cord may be laced through the markers $p$. To show the curve as plotted by the ends of the white portion of the cords $i$, additional white markers $p$ may be secured to them and also the white cord laced through them.

Furthermore, my chart may be adapted by advancing certain of the vertical and horizontal indicia to show a ruled background of any desired arrangement.

I claim:

1. A graphical chart for the purpose described comprising, a frame consisting of a back and sides, one or more sides of the frame adapted to receive marginal notations, and a primary, and a complementary series of independent, lineal indicia elements, one of said series overlying and intersecting the other, and each of said indicia elements being arranged relative to a particular item of said marginal notations and independently lineally movable.

2. A graphical chart for the purpose described comprising, a frame consisting of a back and sides, one or more sides of the frame adapted to receive marginal notations, a primary, and a complementary series of independent, lineal indicia elements, one of said series overlying and intersecting the other, and each of said indicia elements being arranged relative to a particular item of said marginal notations and independently lineally movable, and markers removably affixed to said indicia elements for reference to certain items of said marginal notations arranged parallel with the indicia element to which the markers last referred to are affixed.

3. A graphical chart for the purpose described comprising, a frame consisting of a back and sides, one or more sides of the frame adapted to receive marginal notations, a primary, and a complementary series of independent, lineal indicia elements, one of said series overlying and intersecting the other, and each of said indicia elements being arranged relative to a particular item of said marginal notations and independently lineally movable, markers removably affixed to said indicia elements for reference to certain items of said marginal notations arranged parallel with the indicia element to which the markers last referred to are affixed, and the sides of said frame being adapted to have other auxiliary markers removably affixed thereto for reference to certain items of the marginal notations carried by such frame side.

4. A graphical chart for the purpose described comprising, a frame consisting of a back and sides, one or more sides of the frame adapted to receive marginal notations, a primary, and a complementary series of independent, lineal indicia elements, one of said series overlying and intersecting the other, and each of said indicia elements being arranged relative to a particular item of said marginal notations and independently lineally movable, markers removably affixed to said indicia elements for reference to certain items of said marginal notations arranged parallel with the indicia element to which the markers last referred to are affixed, the sides of said frame being adapted to have other auxiliary markers removably affixed threto for reference to certain items of the marginal notations carried by such frame side, and movable bar-like lineal elements affixed to the frame, crosswise dividing the face of the separate section.

5. A graphical chart for the purpose described comprising, a frame consisting of a back and sides, one or more sides of the frame provided with means adapted to carry a strip bearing marginal notations, a primary, and a complementary series of independent, lineal indicia elements, one of said series overlying and intersecting the other, and each of said indicia elements being arranged relative to a particular item of said marginal notations and independently lineally movable, said lineal elements having sections contrasted with each other, markers removably affixed to said indicia elements for reference to certain items of said marginal notations arranged parallel with the indicia element to which the markers last referred to are affixed, the sides of said frame being adapted to have other auxiliary markers removably affixed thereto for reference to certain items of the marginal notations carried by such frame side, and movable bar-like lineal elements affixed to the frame, crosswise dividing the face of the separate section.

6. A graphical chart for the purpose described comprising, a frame consisting of a back and sides, one or more sides of the frame provided with means adapted to carry a strip bearing marginal notations, a primary, and a complementary series of independent, lineal indicia elements, one of said series overlying and intersecting the other, and each of said indicia elements being arranged relative to a particular item of said marginal notations and independently lineally movable, said lineal elements having sections contrasted with each other, markers carried by said indicia elements at the dividing line of said contrasted sections, markers removably affixed to said indicia elements for reference to certain items of said marginal notations arranged parallel with the indicia element to which the markers last referred to are affixed, the sides of said frame being adapted to have other auxiliary markers removably affixed thereto for reference to certain items of the marginal notations carried by such frame side, and movable bar-like lineal elements affixed to the frame, crosswise dividing the face of the separate section.

7. A graphical chart for the purpose described comprising, a frame consisting of a back and sides, one or more sides of the frame provided with means adapted to carry a strip bearing marginal notations, a primary, and a complementary series of independent, lineal indicia elements, one of said series overlying and intersecting the other, and each of said indicia elements being arranged relative to a particular item of said marginal notations and independently lineally movable, and said lineal elements having sections contrasted with each other.

8. A graphical chart for the purpose described comprising, a case consisting of a back and sides, one or more sides of the frame provided with means adapted to carry a strip bearing marginal notations, a primary, and a complementary series of independent, lineal indicia elements, one of said series overlying and intersecting the other, and each of said indicia elements being arranged relative to a particular item of said marginal notations and independently lineally movable, and a lockable cover for said case.

9. A graphical chart for the purpose described comprising, a case consisting of a back and sides, one or more sides of the frame provided with means adapted to carry a strip bearing marginal notations, a primary, and a complementary series of independent, lineal indicia elements, one of said series overlying and intersecting the other, and each of said indicia elements being arranged relative to a particular item of said marginal notations and independently lineally movable, said lineal elements having sections contrasted with each other, markers carried by said indicia elements at the dividing line of said contrasted sections, markers removably affixed to said indicia elements for reference to certain items of said marginal notations arranged parallel with the indicia element to which the markers last referred to are affixed, the sides of said frame being adapted to have other auxiliary markers removably affixed thereto for reference to certain items of the marginal notations carried by such frame side, movable bar-like elements affixed to the frame, crosswise dividing the face of the separate section, and a lockable cover for said case.

10. A chart of the character described comprising a frame adapted for receiving marginal notations, a rectangular plane section inclosed by said frame, the edges of said frame section being rounded, and a primary and complementary series of independent endless cords one of said series overlying and intersecting the other, and each of said cords being arranged relative to a particular item of said marginal notations and independently lineally movable.

11. A chart of the character described comprising a frame adapted for receiving marginal notations, a rectangular plane section inclosed by said frame, the edges of said frame section being rounded, a primary, and a complementary series of independent endless cords one of said series overlying and intersecting the other, and each of said cords being arranged relative to a particular item of said marginal notations and independently lineally movable, and the edges of said section provided with means for holding the series of said cords in parallel and spaced relation respectively.

12. A chart of the character described comprising a frame adapted for receiving marginal notations, a rectangular plane section inclosed by said frame, the edges of said frame section being adapted to serve as carriers for movable elements, a primary, and a complementary series of independent endless cords one of said cords overlying and intersecting the other, and each of said cords being arranged relative to a particular item of said marginal notations and independently lineally movable, the edges of said section provided with means for holding the series of said cords in parallel and spaced relation respectively, said cords having sections contrasted with each other, and cylindrical clips carried by said cords.

13. A chart of the character described comprising a frame adapted for receiving marginal notations, a rectangular plane section inclosed by said frame, the edges of said frame section being adapted to serve as carriers for movable elements, a primary, and a complementary series of independent endless cords one of said series overlying and intersecting the other, and each of said cords being arranged relative to a particular item of said marginal notations and independently lineally movable, the edges of said section provided with means for holding the series of said cords in parallel and spaced relation respectively, said cords having sections contrasted with each other, cylindrical clips carried by said cords at the dividing line of said contrasted sections, and supplementary markers adapted to be movably affixed to said cords auxiliary symbols carried on said supplementary markers.

14. A chart of the character described comprising a frame adapted for receiving marginal notations, a rectangular plane section enclosed by said frame, the edges of said frame section being adapted to serve as carriers for movable elements, a primary, and a complementary series of independent endless cords one of said series overlying and intersecting the other, and each of said cords being arranged relative to a particular item of said marginal notations and independently lineally movable, the edges of said section provided with means for holding the series of said cords in parallel and spaced relation respectively, said cords having sections contrasted with each other, cylindrical clips carried by said cords at the dividing line of said contrasted sections, supplementary markers adapted to be movably affixed to said cords auxiliary symbols carried on said supplementary markers, means for affixing movable markers at a side of the frame relative to said indicia and elongate markers adapted to be removably affixed to said means, and removable divider bars carried by said frame, notations carried by said divider bar.

15. A chart of the character described comprising a case adapted for receiving marginal notations, a rectangular plane section inclosed by said frame, the edges of said frame section being adapted to serve as carriers for movable elements, a primary, and a complementary series of independent endless cords one of said series overlying and intersecting the other, and each of said cords being arranged relative to a particular item of said marginal notations and independently lineally movable, the edges of said section provided with means for holding the series of said cords in parallel and spaced relation respectively, said cords having sections contrasted with each other, cylindrical clips carried by said cords at the dividing line of said contrasted sections, supplementary markers adapted to be movably affixed to said cords auxiliary symbols carried on said supplementary markers, means for affixing movable markers at a side of the frame relative to said indicia and elongate markers adapted to be removably affixed to said means, removable divider bars carried by said frame, notations carried by said divider bar, and a lockable cover for said case.

16. A graphical chart comprising a support, a group of spaced parallel members mounted on said support for relative independent lineal movement, and a second group of spaced parallel members mounted on said support for relative independent lineal movement in angular relation with said first mentioned group for chart forming cooperation.

17. A graphical chart comprising a support having a charting area, a lineal member embracing said support and extending over said charting area, said member being mounted for lineal movement, another lineal member embracing said support and extending over said charting area in overlapping angular relation to the first mentioned lineal member, said second mentioned lineal member being mounted for lineal movement, each of said members having charting cooperation with each other and the charting area of said support.

18. A graphical chart comprising a support having a charting area, a lineal member embracing said support and extending over said charting area, said member being mounted for lineal movement, another lineal member embracing said support and extending over said charting area in overlapping angular relation to the first mentioned lineal member, said second mentioned lineal member being mounted for lineal movement, each of said members having charting cooperation with each other and the charting area of said support, and index slips adjacent said charting area for cooperation with said lineal members.

19. A graphical chart comprising a support having a charting area, a lineal member embracing said support and extending over said charting area, said member being mounted for lineal movement, another lineal member embracing said support and extending over said charting area in overlapping angular relation to the first mentioned lineal member, said second mentioned lineal member being mounted for lineal movement, each of said members having charting cooperation with each other and the charting area of said support, and a signal removably mounted on said support and adapted for cooperation with either of said lineal members.

20. A graphical chart comprising a support having a charting area, a lineal member embracing said support and extending over said charting area, said member being mounted for lineal movement, another lineal member embracing said support and extending over said charting area in overlapping angular relation to the first mentioned lineal member, said second mentioned lineal member being mounted for lineal movement, each of said members having charting cooperation with each other and the charting area of said support, and detachable marking means adapted for adjustable cooperation with either of said lineal members.

WALTER D. WHITCOMB.